(12) United States Patent
Ghosh et al.

(10) Patent No.: US 10,922,761 B2
(45) Date of Patent: Feb. 16, 2021

(54) PAYMENT CARD NETWORK DATA VALIDATION SYSTEM

(71) Applicant: MASTERCARD INTERNATIONAL INCORPORATED, Purchase, NY (US)

(72) Inventors: Debashis Ghosh, Charlotte, NC (US); Randall K. Shuken, Westport, CT (US); Manash Bhattacharjee, Jersey City, NJ (US)

(73) Assignee: Mastercard International Incorporated, Purchase, NY (US)

( * ) Notice: Subject to any disclaimer, the term of this patent is extended or adjusted under 35 U.S.C. 154(b) by 772 days.

(21) Appl. No.: 15/226,484

(22) Filed: Aug. 2, 2016

(65) Prior Publication Data

US 2018/0040073 A1 Feb. 8, 2018

(51) Int. Cl.
| | | |
|---|---|---|
| *G06Q 20/00* | (2012.01) | |
| *G06Q 40/00* | (2012.01) | |
| *G06Q 20/34* | (2012.01) | |
| *G06Q 20/40* | (2012.01) | |
| *G06Q 20/20* | (2012.01) | |

(52) U.S. Cl.
CPC ......... *G06Q 40/123* (2013.12); *G06Q 20/207* (2013.01); *G06Q 20/34* (2013.01); *G06Q 20/401* (2013.01); *G06Q 20/405* (2013.01)

(58) Field of Classification Search
CPC .................................................. G06Q 40/00
USPC .......................................................... 705/31
See application file for complete search history.

(56) References Cited

U.S. PATENT DOCUMENTS

| 7,263,506 B2* | 8/2007 | Lee .................. G06Q 20/04 705/318 |
| 7,319,986 B2* | 1/2008 | Praisner ............ G06Q 20/10 705/39 |
| 8,595,058 B2* | 11/2013 | Fordyce, III ....... G06Q 30/0269 705/14.1 |

(Continued)

OTHER PUBLICATIONS

Guide on Identity Theft for Victims and Consumers (Commonwealth of Ma) (Year: 2015).*

(Continued)

*Primary Examiner* — Bruce I Ebersman
(74) *Attorney, Agent, or Firm* — Howard IP Law Group, PC

(57) ABSTRACT

A method for validating tax data of a taxable entity comprises: receiving at a computer processor, payment card transaction records including at least one of a customer identifier, a merchant identifier, and transaction purchase amounts corresponding to entity purchase transactions over a given time period; analyzing the payment card transaction records data to generate one or more spending profiles according to one or more categories of merchants; correlating the entity spending profiles with one or more other aggregated spending profiles representative of historical spending by additional entities whose reported income is within a given range of the entity reported income; comparing the degree of correlation with a threshold and generating a signal indicative of a request for secondary review of a tax filing of the entity when the degree of correlation is below the threshold; and otherwise generating a signal indicative of a validated tax filing of the entity.

8 Claims, 8 Drawing Sheets

(56) References Cited

U.S. PATENT DOCUMENTS

| | | | | |
|---|---|---|---|---|
| 2014/0379531 A1* | 12/2014 | Huang | ............... | G06Q 20/207 |
| | | | | 705/26.81 |
| 2015/0348083 A1* | 12/2015 | Brill | ................. | G06Q 30/0222 |
| | | | | 705/14.23 |
| 2016/0063645 A1* | 3/2016 | Houseworth | ....... | G06Q 40/123 |
| | | | | 705/31 |
| 2017/0270629 A1* | 9/2017 | Fitzgerald | ........... | G06Q 40/123 |

OTHER PUBLICATIONS

Torrey, Amber, "The Discriminant Analysis Used by the IRS to Predict Profitable Individual Tax Return Audits," The Honors Program, Senior Capstone Project, Apr. 2008.

\* cited by examiner

| MCC | Merchant Category | Reportable under 6041/6041A and Authority for Exception |
|---|---|---|
| 0742 | Veterinary Services | Yes |
| 0763 | Agricultural Cooperative | Yes |
| 0780 | Landscaping Services | Yes |
| 1520 | General Contractors | Yes |
| 1711 | Heating, Plumbing, A/C | Yes |
| 1731 | Electrical Contractors | Yes |
| 1740 | Masonry, Stonework, and Plaster | Yes |
| 1750 | Carpentry Contractors | Yes |
| 1761 | Roofing/Slating, Sheet Metal | Yes |
| 1771 | Concrete Work Contractors | Yes |
| 1799 | Special Trade Contractors | Yes |
| 2741 | Miscellaneous Publishing and Printing | Yes |
| 2791 | Typesetting, Plate Making, and Related Services | Yes |
| 2842 | Specialty Cleaning | Yes |
| 3000-3299 | Airlines | Yes |
| 3351-3441 | Car Rental | Yes |
| 3501-3790 | Hotels/Motels/Inns/Resorts | Yes |
| 4011 | Railroads | No 1.6041-3(c) |
| 4111 | Commuter Transport, Ferries | Yes |
| 4112 | Passenger Railways | Yes |
| 4119 | Ambulance Services | Yes |
| 4121 | Taxicabs/Limousines | Yes |
| 4131 | Bus Lines | Yes |
| 4214 | Motor Freight Carriers and Trucking – Local and Long Distance, Moving and Storage Companies, and Local Delivery Services | No 1.6041-3(c) |
| 4215 | Courier Services | Yes |
| 4225 | Public Warehousing and Storage – Farm Products, Refrigerated Goods, Household Goods and Storage | No 1.6041-3(c) |

FIG. 8

PAYMENT CARD NETWORK DATA VALIDATION SYSTEM

CROSS-REFERENCE TO RELATED APPLICATIONS

None.

FIELD OF INVENTION

The present invention relates to statistical verification and validation of payment network data. More particularly, the invention relates to systems and methods for tax liability validation based on purchase data over a payment card network.

BACKGROUND

Tax authorities such as the Internal Revenue Service (IRS), as well as state and local agencies, spend significant resources and have developed sophisticated technological systems and solutions intended to quickly and efficiently detect, verify, and/or recover taxable income due. However, despite the present technological solutions, unreported income (including underreported income) remains a significant problem. One report estimates that the United States loses hundreds of billions per year in taxes due to unreported income.

A business and technological challenge arises in the context of a computer network environment facilitated by payment card transaction data communicated over a payment card network, wherein problems arise within the realm of how computer systems may be configured to detect and potentially recover lost revenue resulting from unreported income.

SUMMARY

A system and method is provided for detecting one or more sources of unreported income based on monitoring of payment card transaction records including purchase data and purchase amounts over a payment card network, in relation to a normalized distribution predicted for a given taxable entity based on historical and actual income and spend data for select merchant categories. Technological developments in the field of payment card networks and computer technologies include generating, processing, categorizing, profile development, and correlation of payment card transaction data associated with one or more customers, merchants, and categories. Payment card transaction processing configured with computer systems as described herein addresses and improves the technical fields of data verification and validation, and improves upon the more precise technological challenges of detecting and potentially recovering (or validating) tax revenue based on customer and/or merchant payment card transaction record data communicated over a payment card network.

Embodiments of the present disclosure serve to assist taxing authorities in verifying reported revenue and tax liability. Embodiments of the present disclosure also implement transaction data processing and utilize purchase data as a proxy for other indicators such as total sales or expected sales growth. Embodiments of the present disclosure process and analyze payment card transactions data received over a payment card network and filter the data to detect deviations in merchant categories of spend and/or income data sufficient to warrant secondary review or audit of a tax filer's activities. In one embodiment, the system and method of the present disclosure triggers such a condition when reported revenue is lower than that detected by processing payment card data by a predetermined value. Embodiments of the present disclosure advantageously enhance efficiency of tax authorities and programs to quickly identify, in a machine method, filers that require a second review based on deviations between actual and historical or predictive data based on transaction data analysis. Embodiments of the invention recognize that not all unreported income is due to intentional errors and omissions. For example, certain changes in regulations (local, state, and/or federal) may be implemented with some merchants unaware of such implementation. For example, state tax changes for taxing certain services such as automobile repairs and other services (e.g. appliance services) may be required of a given merchant. Embodiments of the present invention enable identification of such merchants based on filtering of merchant category code (MCC) contained in each of the payment card transaction records, classification processing, and historical analysis based on payment card data relative to similarly situated merchants who are paying said services. The above thereby lowers cost and potentially increases tax receipts for federal, state, and/or local authorities. In addition, disclosed embodiments of the invention may assist by identifying in a machine method revenue (or spend) profile data based on certain MCC codes within the payment card transaction records that heretofore were not subject to tax reporting, thereby educating merchants while at the same time assisting in the collection of tax revenue.

In one embodiment, a method for validating tax data including at least one of income and expense data corresponding to a taxable entity in a given tax jurisdiction, comprises: receiving at a computer processor, payment card transaction records data including at least one of customer identifiers, merchant identifiers, merchant category codes, and transaction purchase amounts corresponding to product purchase transactions of the taxable entity over a given time period; analyzing the payment card transaction records data of the taxable entity to generate one or more spending profiles for the entity according to one or more categories of merchants; correlating the one or more spending profiles of the entity with one or more other aggregated spending profiles representative of historical spending by additional entities whose reported income is within a predetermined (close) range of the entity reported income to generate a correlation score; comparing the correlation score with a threshold correlation score value to generate a correlation index indicative of the degree of correlation between the entity profile spending and the aggregated profile spending; and on the condition that the correlation index deviates from a predetermined threshold indicative of a high degree of uncorrelation, generating a signal indicative of a request for secondary review of a tax filing of the entity; and otherwise generating a signal indicative of a validated tax filing of the entity. Further, as tax rates increase or decrease over time, embodiments of the present invention periodically receive and store new tax rate data to assist in the capture and computation of a more accurate estimated tax revenue taking such tax rate fluctuations into account.

In one embodiment, there is disclosed a validation computing device for validating tax data including at least one of income and expense data corresponding to a taxable entity in a given tax jurisdiction. The validation computing device comprises a memory device and a processor coupled to the memory device. The validation computing device is configured to: receive all payment card transaction records data of a taxable entity over a payment card computer network and including at least one of customer identifiers, merchant identifiers, merchant category codes, and transaction purchase amounts corresponding to product purchase transactions of the taxable entity over a given time period; generate one or more spending profiles for the entity according to one or more categories of merchants based on the payment card transaction records data; receive historical data including reported tax income and expense data of the entity and of other entities sharing the same one or more profiles, and their transaction records; determine, using the historical data and the one or more spending profiles for said entity; a correlation indicator representative of the degree of correlation between the entity spending profiles and the historical data; cause a taxing authority to initiate a secondary review of the tax filing of the entity when the correlation indicator is greater than a threshold value.

In one embodiment, a computer-readable storage medium having computer-executable instructions embodied thereon, wherein when executed by a tax validation computing device having at least one processor, the computer-executable instructions cause the tax validation computing device to: receive payment card transaction records data including at least one of customer identifiers, merchant identifiers, merchant category codes, and transaction purchase amounts corresponding to product purchase transactions of the taxable entity over a given time period; generate one or more spending profiles for the entity according to one or more categories of merchants based on the payment card transaction records data; receive historical data including reported tax income and expense data of said entity and of other entities sharing the same one or more profiles, and their transaction records; determine, using the historical data and the one or more spending profiles for said entity; a correlation indicator representative of the degree of correlation between the entity spending profiles and the historical data; output a signal to cause a taxing authority to initiate a secondary review of the tax filing of the entity when the correlation indicator is greater than a threshold value.

BRIEF DESCRIPTION OF THE DRAWINGS

FIG. 8 is a partial exemplary list of merchant category codes (MCC) and general merchant categories useful for lookup and filtering in embodiments of the present invention.

DETAILED DESCRIPTION

Figure 1:
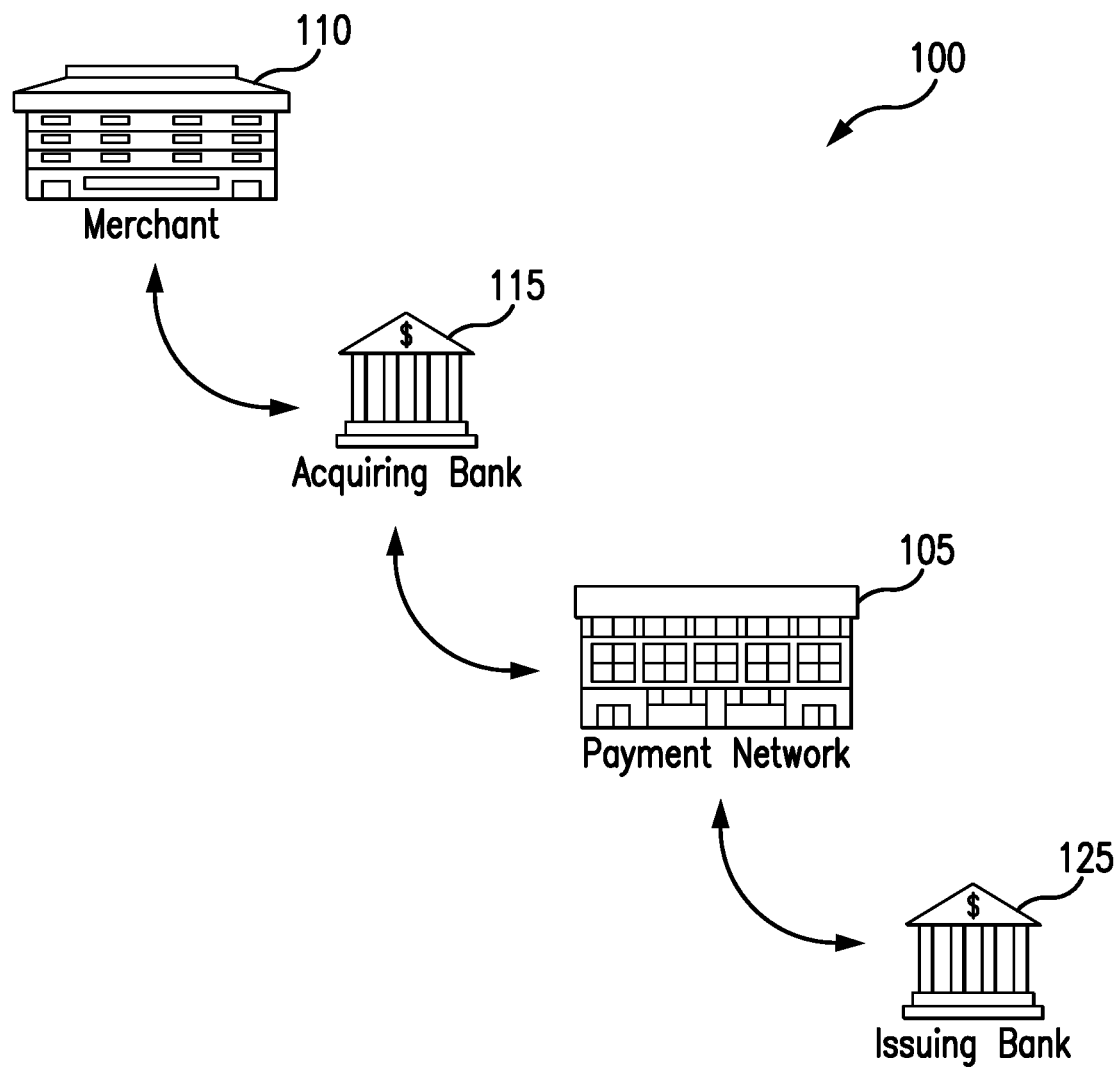
FIG. 1 illustrates a system architecture of a multi-party transaction card industry system for enabling payment-by-card transactions within which some embodiments may be implemented.

Disclosed herein are processor-executable methods, computing systems, and processing related to payment card networks and payment card transaction messages transmitted via payment card networks. Technological improvements in the detection and communication of data relating to the determination of a category or type of product or service purchased by a customer using a payment card in a given transaction derived from payment card transaction data from customers and merchants are leveraged within the technological field of information validation to improve upon verification and validation of tax revenue. Transaction data may include one or more of customer information, merchant information including merchant category code, and transaction amounts and are processed to identify purchasers of particular properties. Transaction data may be stored in a data base (e.g. a relational data base) and analyzed to link relevant fields within various records to one another in order to determine and establish relationships (e.g. cause and effect, associations and groupings) and links between and among categories of services, customers, merchants, geographic regions, frequencies of services, overall spend at a merchant and/or according to merchant category code (MCC), spend by owner, and the like. The system may filter the transaction records according to the MCC code classifying the merchant based on a market segment serviced by the merchant. The MCC may be associated with a taxation status. For example, if the MCC corresponds to a provider of certain services, a customer that purchases services from the merchant may not be required to report payments for those services to a government tax agency, based on the particular requirements of local, state, federal authorities. The MCC code (or MCC) may be assigned by the acquirer. The acquirer may assign a given MCC to a merchant in response to the merchant agreeing to accept the payment instrument as a form of payment. Embodiments of the invention may aggregate payment card transaction records data based on a plurality of MCC codes within a more general merchant category, such more general merchant categories including but not limited to clothing stores, retail outlet services, transportation services, restaurants, lodging, and the like.

An analytics engine utilizing statistical analyses and techniques applied to the payment card transaction data is implemented to analyze the payment card transactions records in view of the MCC codes and/or aggregation of a plurality of select MCC codes into more general merchant categories to determine relationships, patterns, and trends between and among the various transaction records as well as transactions and purchase amounts related to both spend at a merchant end and spend at the consumer/customer end. The engine is further configured to create metrics of transactions mapped to categories such as merchant type in order to develop cardholder and/or entity profiles that ascribe attributes or traits to such taxable entities based on the payment card transaction data. Based on the payment card transaction data, profile spend of purchasers that relate to specific merchants (and taxable entities) are linked and provide insight as to the type or category of product (or service) purchased in a given transaction. Furthermore, profiles of purchasers may be generated and those purchasers exhibiting similar purchasing trends or tendencies, and/or geographic regions, may be grouped together, as well as merchants who provide similar services, similar price purchasing, and/or similar geography. The transaction records may be processed and segmented into various categories in order to determine profile information relating to taxable entities, purchasers, and merchants including purchase amounts, frequencies, and drivers or factors and/or conditions affecting the determined purchased properties or services, by way of non-limiting example. In one embodiment, payment card transaction data is prepared and augmented, for example, to include information for the following variables: cardholder account number (account), dollar amount of transaction (amount), industry type (industry), transaction processing date, merchant location identification (loc_id), merchant category code or merchant code (MCC), merchant zip code (mzip), and transaction date (transdate). Further, the batch of augmented transaction data may be sorted or indexed by cardholder account number. The batch of augmented transaction data is filtered by MCC code in order to categorize each of the transactions for tax purposes according to local, state, and/or federal rules stored in a data base, for assessing whether or not the transaction is to be reported, and to what extent the amount of such transaction is to be reported (e.g. 100%, 70%, 30%, etc.) for a particular taxable entity. Spend profile at merchants as well as overall spend by a taxable entity (e.g. customer or purchaser) may be processed and stored in memory based on the payment card transactions data received over the payment card network. Historical and actual tax data (e.g. historical tax return data) may be received and processed to generate normal or expected correlations between variables such as reported income and spend, or reported sales and payment card spend, by way of example, and placed in memory for like profile accounts. A computer algorithm detects when spend data and/or reported revenue data based on the transaction card data varies more than a predetermined threshold (e.g. 20%) from the normal or expected correlation values, and generates a signal to trigger a secondary review of the account associated with the taxable entity. In an embodiment, the system detects anomalies when an account is highly deviant from a normalized pattern. For example, a card holder who is spending ten times more on high end restaurants than average individuals with similar income (within a predetermined range) and federal tax filing data (similar identified income and expense categories within a predetermined range).

The analysis engine may utilize independent variables as well as dependent variables representative of one or more purchasing events, customer types or profiles, merchant types or profiles, purchase amounts, and purchasing frequencies, by way of example only. The analysis engine may use models such as regression analysis, correlation, analysis of variances, time series analysis, determination of frequency distributions, segmentation and clustering applied to the transactions data in order to determine correlations using historical and actual payment card data. In an embodiment, a processing optimization component or module of the system may perform outlier analyses and scatterplot processing of attribute data such as total receipt value vs. tax receipt collection value to determine outliers. The optimization may be implemented as a decision tree optimizer using normal curves or scatter plots, regression analysis, neural network agent, an optimizer implementing high-level software language logic or an estimation module.

In accordance with an exemplary embodiment, the system and method described herein provide a framework to utilize payment card transactions along with actual tax information to determine whether spend and reported revenues and/or profits vary more than a predetermined value (e.g. 20%) in order to initiate secondary review via a tax authority (e.g. IRS, state, city tax computing system). Correlation may be accomplished using context sensitive analysis of the transaction data, using information from an entity operating a website or information of historical transactions associated with the user alone, combined, or even with the assistance of a predictive model. The predictive model(s) useful for application in the present disclosure may include one or more of neural networks, Bayesian networks (such as Hidden Markov models), expert systems, decision trees, collections of decision trees, support vector machines, or other systems known in the art for addressing problems with large numbers of variables. In embodiments, the predictive models may be trained on prior data and outcomes using a historical database of prior transactions and resulting correlations relating to a same taxable entity or user, different users, or a combination of a same and different users. In embodiments of the present invention, the predictive model may be implemented as part of calculation module or tool.

It is to be understood that a payment card is a card that can be presented by the cardholder (i.e., customer) to make a payment. By way of example, and without limiting the generality of the foregoing, a payment card can be a credit card, debit card, charge card, stored-value card, or prepaid card or nearly any other type of financial transaction card, in physical or virtual form. It is noted that as used herein, the term "customer", "cardholder," "card user," and/or "card recipient" can be used interchangeably and can include any user who holds a payment card for making purchases of goods and/or services. Further, as used herein in, the term "issuer" or "attribute provider" can include, for example, a financial institution (i.e., bank) issuing a card, a merchant issuing a merchant specific card, a stand-in processor configured to act on-behalf of the card-issuer, or any other suitable institution configured to issue a payment card. As used herein, the term "transaction acquirer" can include, for example, a merchant, a merchant terminal, an automated teller machine (ATM), or any other suitable institution or device configured to initiate a financial transaction per the request of the customer or cardholder.

A "payment card processing system" or "credit card processing network", such as the MasterCard network exists, allowing consumers to use payment cards issued by a variety of issuers to shop at a variety of merchants. With this type of payment card, a card issuer or attribute provider, such as a bank, extends credit to a customer to purchase products or services. When a customer makes a purchase from an approved merchant, the card number and amount of the purchase, along with other relevant information, are transmitted via the processing network to a processing center, which verifies that the card has not been reported lost or stolen and that the card's credit limit has not been exceeded. In some cases, the customer's signature is also verified, a personal identification number is required or other user authentication mechanisms are imposed. The customer is required to repay the bank for the purchases, generally on a monthly basis. Typically, the customer incurs a finance charge for instance, if the bank is not fully repaid by the due date. The card issuer or attribute provider may also charge an annual fee.

A "business classification" is a group of merchants and/or businesses, classified by the type of goods and/or service the merchant and/or business provides. For example, the group of merchants and/or businesses can include merchants and/ or businesses which provide similar goods and/or services as correlated within a grouping of MCC codes. In addition, the merchants and/or businesses can be classified based on geographical location, sales, and other types of classification, which can be used to define a merchant and/or business with similar goods, services, locations, economic and/or business sector, industry and/or industry group.

Determination of a merchant classification or category may be implemented using one or more indicia or merchant classification codes to identify or classify a business by the type of goods or services it provides. For example, ISO Standard Industrial Classification ("SIC") codes may be represented as four digit numerical codes assigned by the U.S. government to business establishments to identify the primary business of the establishment. Similarly a "Merchant Category Code" or "MCC" is also a four-digit number assigned to a business by an entity that issues payment cards or by payment card transaction processors at the time the merchant is set up to accept a particular payment card. Such classification codes may be included in the payment card transactions records. The merchant category code or MCC may be used to classify the business by the type of goods or services it provides. For example, in the United States, the merchant category code can be used to determine if a payment needs to be reported to the IRS for tax purposes. In addition, merchant classification codes are used by card issuers to categorize, track or restrict certain types of purchases. Other codes may also be used including other publicly known codes or proprietary codes developed by a card issuer, such as NAICS or other industry codes, by way of non-limiting example.

As used herein, the term "processor" broadly refers to and is not limited to a single- or multi-core general purpose processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Referring now to FIG. 1, there is shown a schematic diagram illustrating an exemplary multi-party payment card system 100 in which some embodiments may be implemented. Payment card system 100 may be a credit card payment system using the MasterCard® payment card system payment network 105. Such payment networks are also referred to as interchanges and interchange networks. Such payment networks provide for transmission of messages compliant with an applicable interchange message specification, such as ISO 8583. Such messages may be of variable length, and include a Message Type Indicator field, which may specify a version of the applicable standard, a message class, a message function and message origin, and may be a 4 digit numeric field. The following field may be a bitmap that indicates which other data elements or data element subfields will be present. Data fields may include primary account number, transaction amount, transmission date and time, time, date, expiration date, merchant type, acquiring institution identification code, forwarding institution identification code, card acceptor terminal identification, card acceptor identification code, and card acceptor name/location. MasterCard® payment card system payment network is a proprietary communications standard promulgated by MasterCard International Incorporated for the exchange of financial transaction data between financial institutions that are members of MasterCard International Incorporated® (MasterCard is a registered trademark of MasterCard International Incorporated located in Purchase, N.Y.).

In payment card system 100, a financial institution 125, termed an issuer, has issued a payment account card, such as a credit card account or a debit card account, to a cardholder. Merchants have established accounts with financial institutions that are termed acquirer or acquiring bank in the transaction system. A transaction commences when a cardholder tenders a card to merchant 110 for payment. Card information is captured by merchant devices, such as a point of sale dedicated device via swiping of a card or chip technology, via a secure Internet connection, or via another technique. In the context of subscription accounts, the card data for the initial payment card transaction is generally captured via a secure Internet connection. The merchant system transmits a payment card transaction message via a secure communications channel to the payment card processing computer system of acquiring bank 115. The payment card processing computer system of acquiring bank 115 then transmits a message requesting transaction approval to a payment card processing system authorization network. The payment card processing system authorization network in turn determines the issuer bank and transmits a message requesting transaction approval to the payment card processing computer system of the issuer bank. The issuer bank payment card processing computer system determines whether to approve the transaction, by determining whether the credit limit is sufficient, if any of the data included in the message requesting approval is indicative of fraud, and then provides a return message to the payment card processing system authorization network. The return message may indicate approval of the transaction, declining of the transaction, and optionally other messages with declining of the transaction, such as an instruction to hold the card. The payment card processing system authorization network then transmits the message to the acquirer computer system. The payment card processing system also stores data indicative of the approved transaction message in a database of approved payment card transactions. A message including approval is then transmitted from the acquiring bank system to the merchant point of sale device or other merchant systems.

The request from the merchant 110 to the acquiring bank 115 may be performed over the telephone or via a general-purpose computer, as an alternative to the use of a dedicated point-of-sale or point-of-interaction terminal, which reads the cardholder's account information from the magnetic stripe, EMV chip, or NFC antenna on the cardholder's payment account card or mobile phone and communicates electronically with the payment card processing system of acquirer 115. Alternatively, acquirer 115 may authorize a third party to perform transaction processing on its behalf. In this case, the point-of-interaction terminal will be configured to communicate with the third party. Such a third party is usually called a "merchant processor" or an "acquiring processor." As noted, for subscriptions, a merchant stores payment card information associated with a cardholder and generates a message requesting authorization from acquirer 115 using the stored payment card information, on a recurring basis. Such transactions are referred to herein as card-on-file (COF) transactions.

When a request for authorization is accepted, the issuer bank systems engage in certain steps. At an appropriate time, the available credit line or available balance of the cardholder's account is decreased. In certain situations, a charge is not posted immediately to a cardholder's account because bankcard associations, such as MasterCard International Incorporated, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account is decreased. Normally, a charge is posted immediately to cardholder's account. The bankcard association then transmits the approval to the acquiring processor for distribution of goods/services, or information or cash in the case of an ATM.

After a transaction is captured, the transaction is cleared and settled between merchant 110, acquirer 115, and issuer 125. Clearing refers to the communication of financial data for reconciliation purposes between the parties. Settlement refers to the transfer of funds between the merchant's account, acquirer, and issuer related to the transaction.

Figure 2:
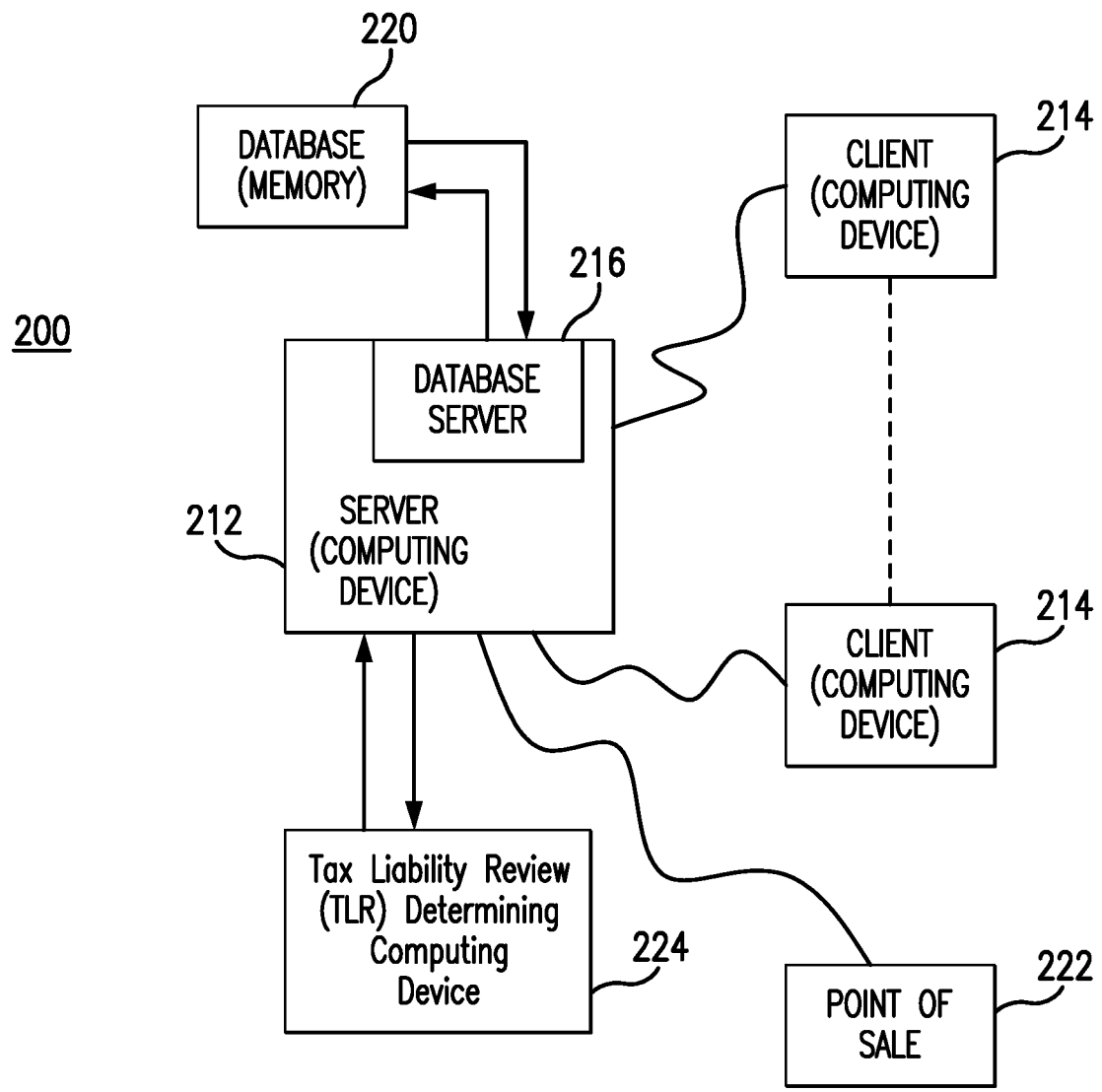
FIG. 2 is a simplified block diagram of a computer system for detecting, validating, and reporting data relating to income based on transactions data in accordance with one example embodiment of the present disclosure.

FIG. 2 is a simplified block diagram of an example system 200 used for determining the tax liability review of an entity identifiable based on payment card transactions data. In the example embodiment, system 200 may be used for performing payment-by-card transactions received as part of processing cardholder transactions. In addition, system 200 is a payment processing system that includes a tax liability review (TLR) computing device 224 configured to determine tax liability of one or more entities in a geographic region based on cardholder transactions. TLR computing device 224 is configured to collect all transaction information of payment card transactions received over a card network from a plurality of cardholders, determine purchase amounts and categories of spend for an entity (e.g. a particular tax ID, individual/owner or business such as an LLC or corporation), determine particular categories for multiple cardholders residing in a geographic region, determine average historical values corresponding to one or more of income, spend, reported sales, business investments for cardholders and/or merchants, and compare the actual and historical data and tax filing data to determine whether an entity may be under reporting income, In the example embodiment, client systems 214 are computers that include a web browser or a software application, which enables client systems 214 to access server system 212 using the Internet. More specifically, client systems 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 can be any device capable of accessing the Internet including, but not limited to, a desktop computer, a laptop computer, a personal digital assistant (PDA), a cellular phone, a smartphone, a tablet, a tablet, or other web-based connectable equipment.

A database server 216 is communicatively coupled to a database 220 that stores data. In one embodiment, database 220 includes transaction information from a plurality of cardholders and paths based on those transactions. In the example embodiment, database 220 is stored remotely from server system 212. In some embodiments, database 220 is decentralized. In the example embodiment, a person can access database 220 via client systems 214 by logging onto server system 212, as described herein.

The TLR computing device 224 is communicatively coupled with the server system 212. The TLR computing device 224 can access the server system 212 to store and access data and to communicate with the client systems 214 through the server system 212. In some embodiments, the TLR computing device 224 may be associated with, or is part of the payment system, or in communication with the payment card system payment network shown in FIG. 1. In other embodiments, the TLR computing device 224 is associated with a third party and is merely in communication with the payment network.

One or more point of sale systems 222 are communicatively coupled with the server system 212. The one or more point of sale systems 222 can be merchants, where the point of sale systems 222 are communicatively coupled with the server system through the payment network. Point of sale systems 222 may be, but are not limited to, machines that accept magnetic stripe, chip, or NFC payment cards or mobile phones, online payment portals, or stored payment card numbers for recurring transactions.

In some embodiments, server system 212 may be associated with a payment card system payment network 105 shown in FIG. 1, and may be referred to as an interchange computer system. Server system 212 may be used for processing transaction data and for registering cardholders and/or merchants into a plurality of programs offered by the payment or interchange network, including, but not limited to, a tax review or tax compliance program. In addition, at least one of client systems 214 may include a computer system associated with an issuer of a transaction card. Accordingly, server system 212 and client systems 214 may be utilized to process transaction data relating to purchases a cardholder makes utilizing a transaction card processed by the interchange network and issued by the associated issuer. At least one client system 214 may be associated with a user or a cardholder seeking to register, access information, or process a transaction with at least one of the interchange network, the issuer, or the merchant. In addition, client systems 214 or point of sale devices 222 may include point-of-sale (POS) devices associated with a merchant and used for processing payment transactions. POS devices may be, but are not limited to, machines that accept card swipes, online payment portals, or stored payment card numbers for recurring transactions.

Figure 3:
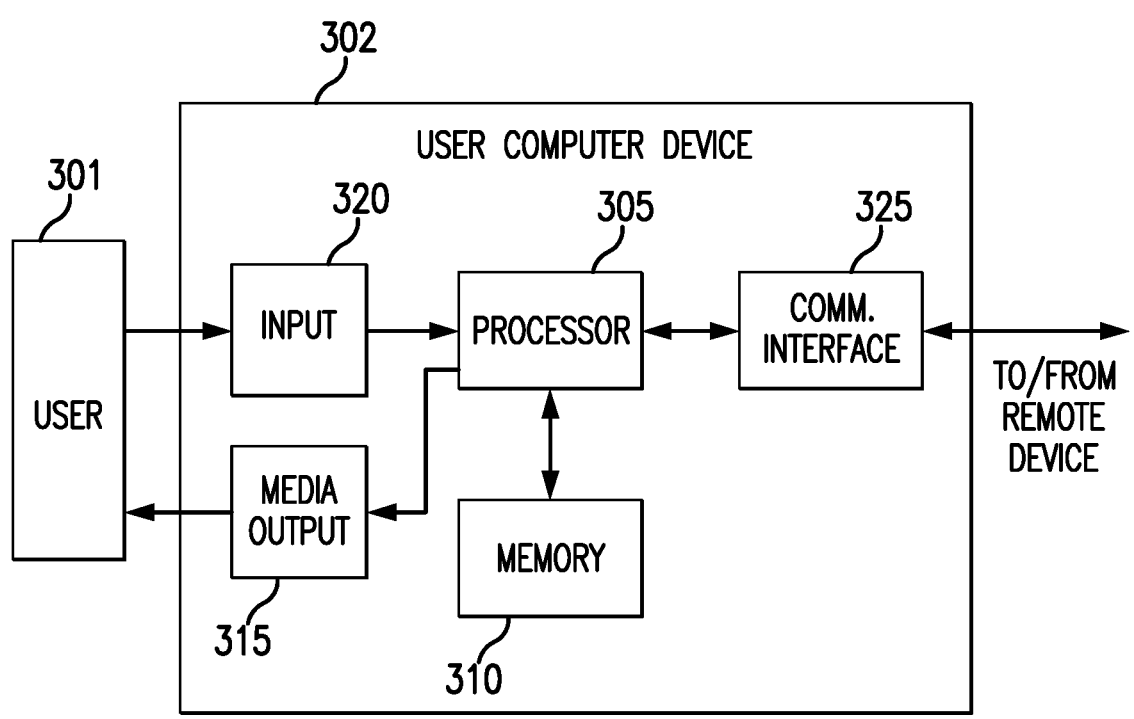
FIG. 3 illustrates an example configuration of a client system shown in FIG. 2, in accordance with one embodiment of the present disclosure.

FIG. 3 illustrates an example configuration of a client system 214 shown in FIG. 2, in accordance with one embodiment of the present disclosure. User computer device 302 is operated by a user 301. User computer device 302 may include, but is not limited to, client systems 214 and TLR computing device 224 (both shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and able to be coupled to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server system 212 (shown in FIG. 2). Communication interface 325 may include, for example, a wired or wireless network adapter and/or a wireless data transceiver for use with a mobile telecommunications network. TLR computing device 224 may be configured so as to invoke and/or otherwise communicate with a remote device (e.g. a particular tax authority) or be invoked by a remote device and/or user according to one or more interfaces described in FIG. 3.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from server system 212. A client application allows user 301 to interact with, for example, server system 212. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
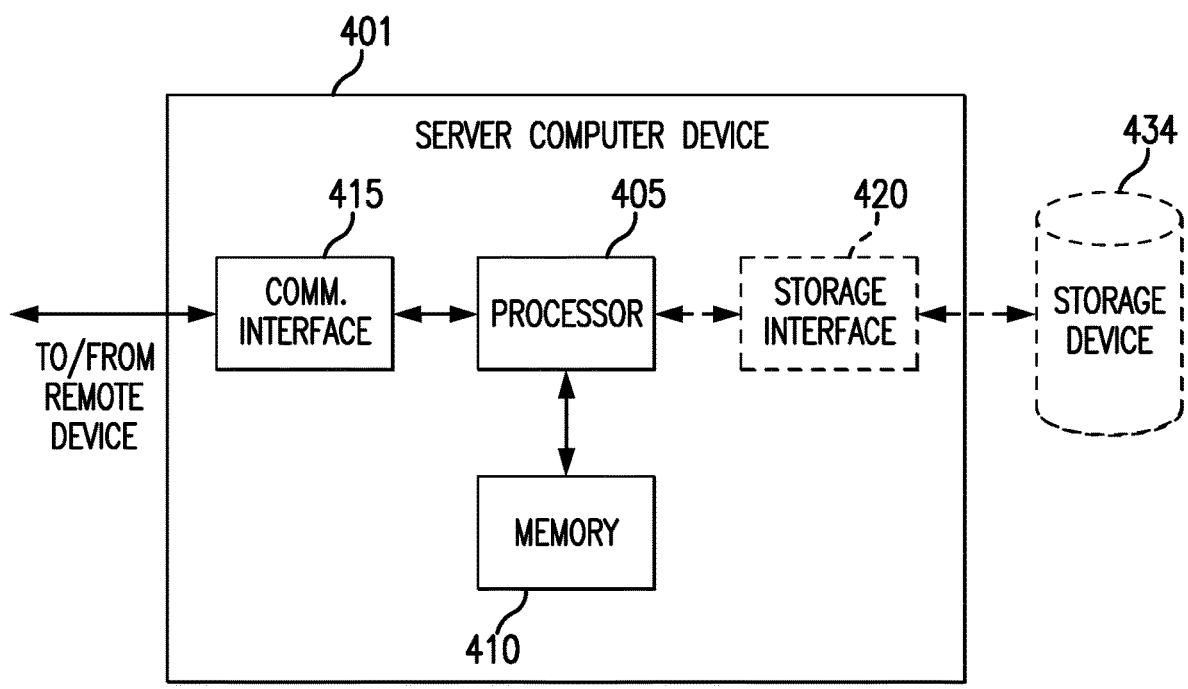
FIG. 4 illustrates an example configuration of the server system shown in FIG. 2, in accordance with one embodiment of the present disclosure.

FIG. 4 illustrates an example configuration of the server system 212 shown in FIG. 2, in accordance with one embodiment of the present disclosure. Server computer device 401 may include, but is not limited to, database server 216 (shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214, or TLR computing device 224 (both shown in FIG. 2). For example, communication interface 415 may receive requests from client systems 214 via the Internet, as illustrated in FIG. 2. TLR computing device 224 may be configured so as to invoke and/or otherwise communicate with a remote device (e.g. a particular tax authority) or be invoked by a remote device and/or user according to one or more interfaces described in FIG. 4.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 5:
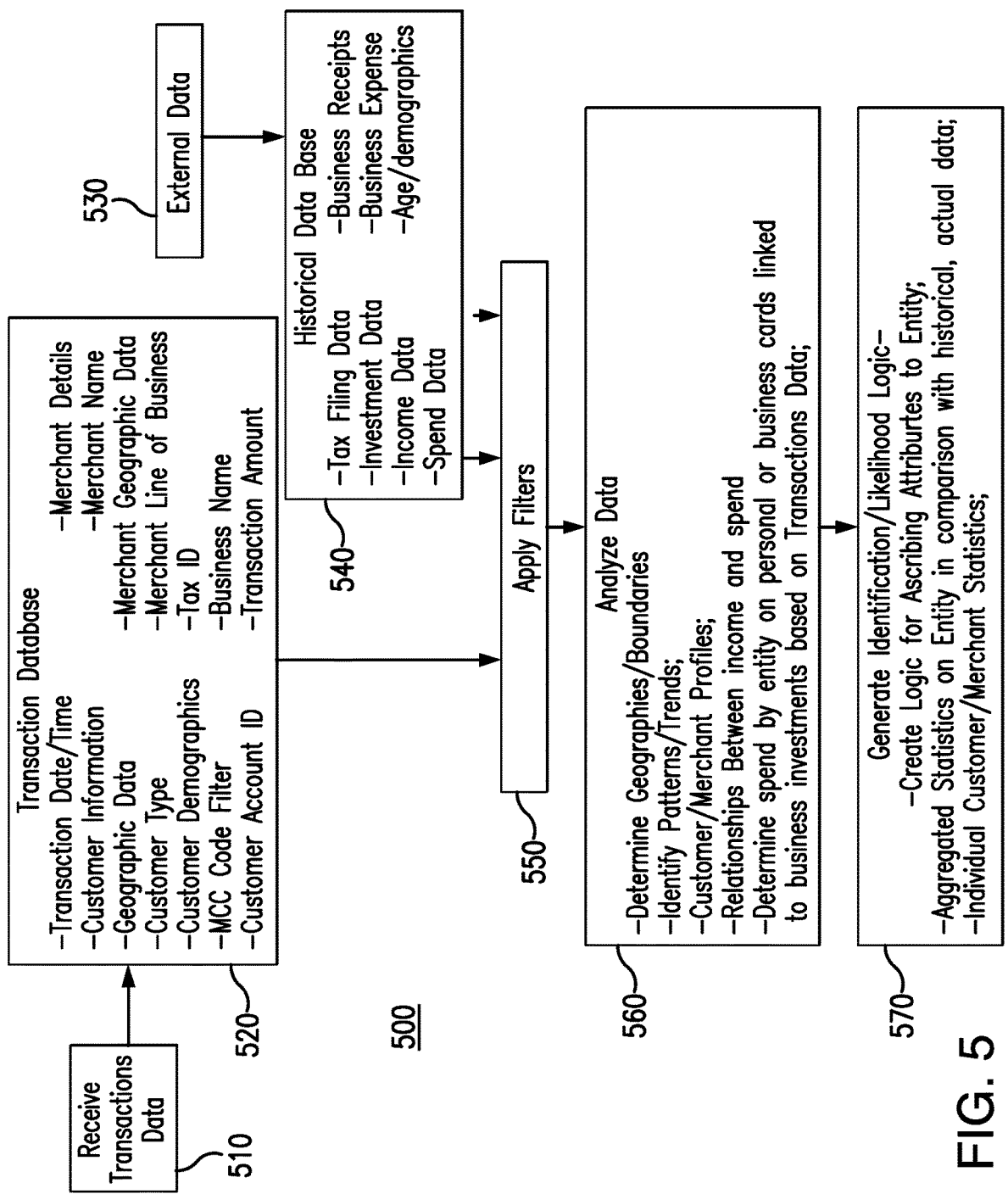
FIG. 5 is a process flow for determining information based on transaction records and using historical data and analytics for income tax validation.
Figure 6:
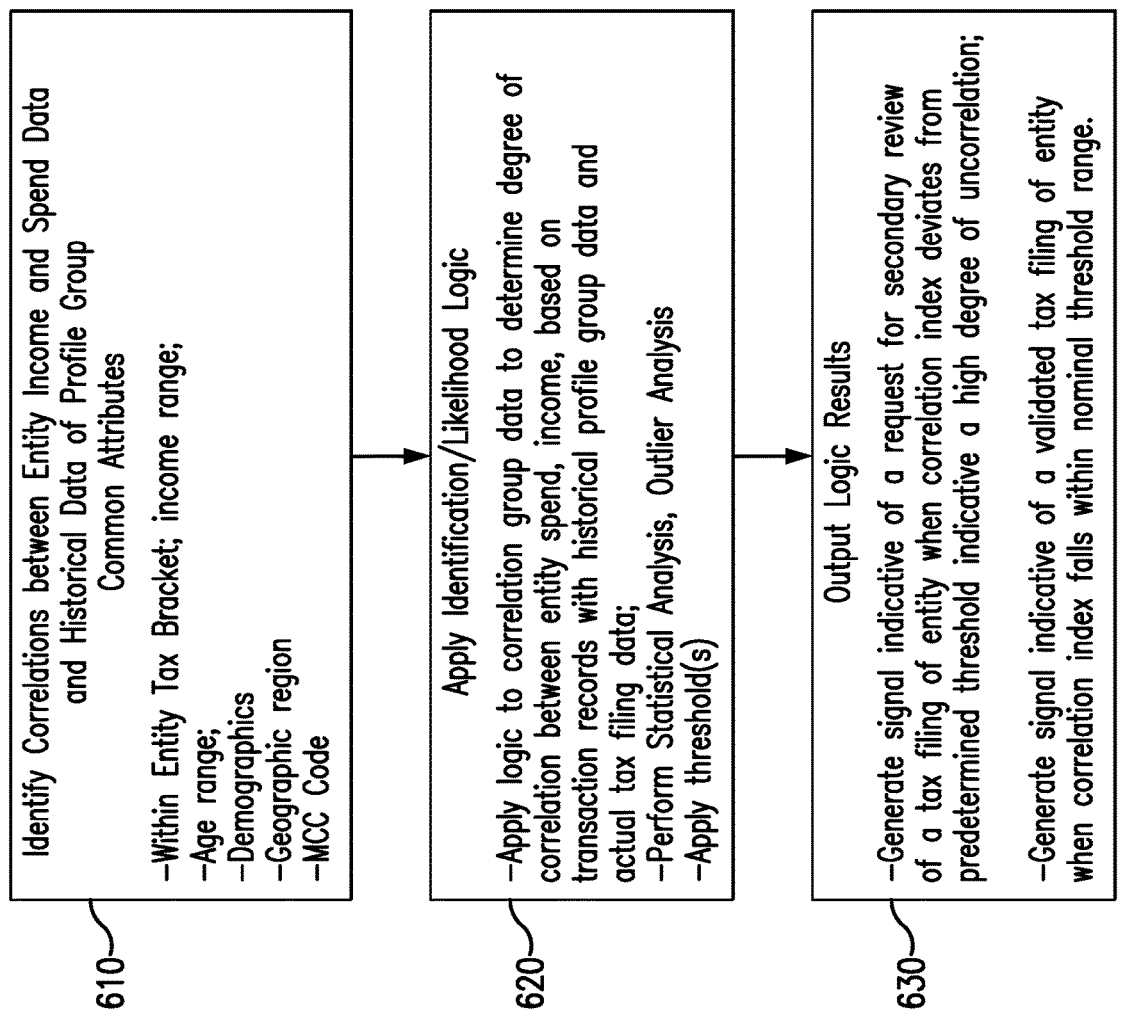
FIG. 6 illustrates an exemplary process flow for correlating transaction records and determining entity income tax anomalies based on transaction records.
Figure 7:
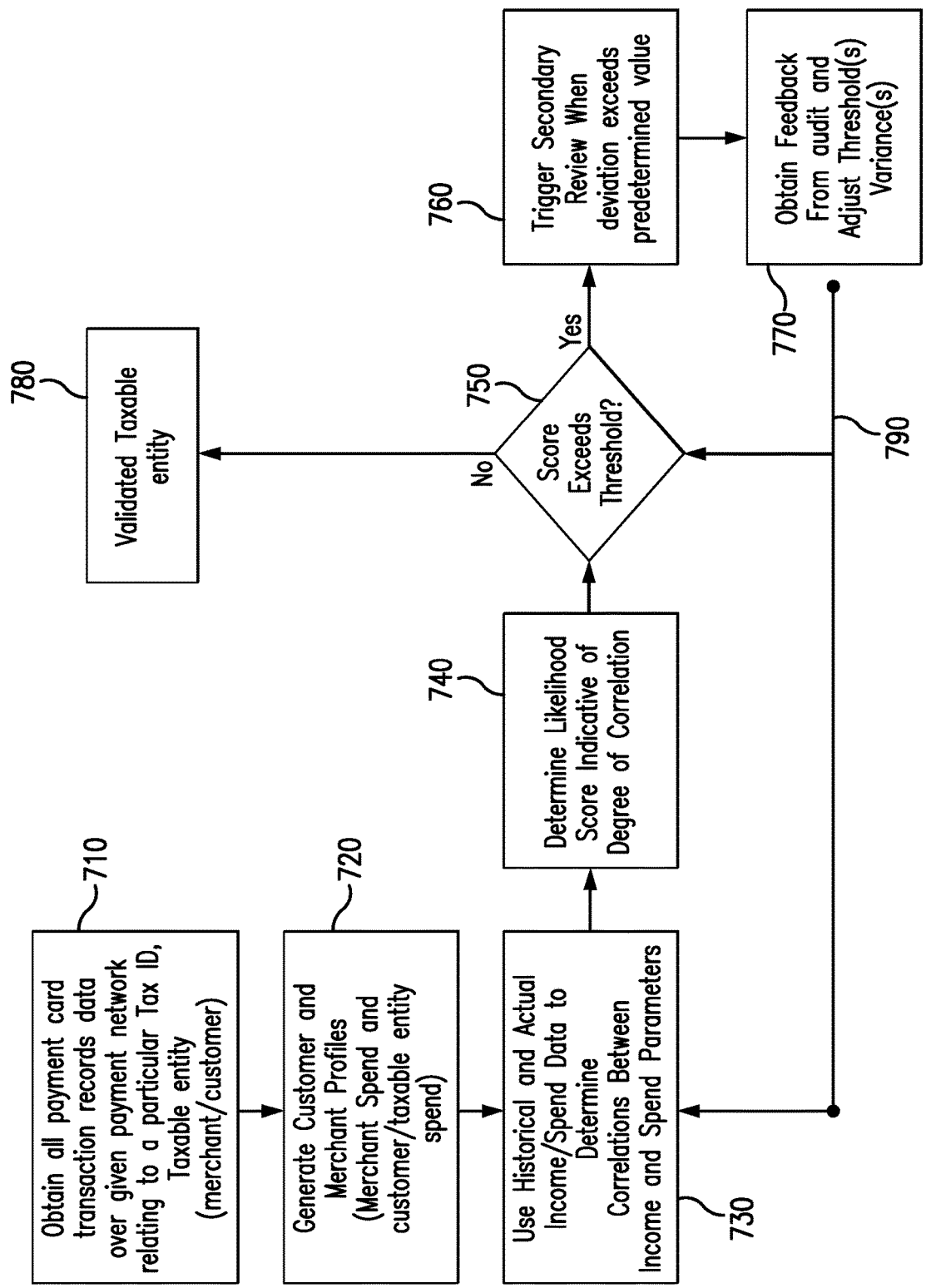
FIG. 7 is an exemplary process flow for income tax validation based on transaction records and using the system of FIG. 2 in accordance with one embodiment of the disclosure.

Referring now to FIG. 5 in conjunction with FIGS. 6 and 7, there is illustrated a system and method for validating tax data (e.g. income, expense) corresponding to a taxable entity in a given jurisdiction. In general, payment card transaction data is received and categorized or grouped by the processor in a plurality of ways so as to decompose or break down the various informational components of the transaction data collected within the database (e.g. memory 410). Payment card transaction data stored in the system may be filtered according to the requirements of a particular application in order to selectively identify specific taxpayer entities, customers, merchants and/or industries for targeted analysis. Filtering of the data may be based on one or more of transaction purchase price (amount), merchant identifier, and customer. In an embodiment, filtering of the data may be based on MCC code, or aggregated based on a plurality of similar MCC codes constituting an MCC general merchant category. For example, the general merchant category of "hotels" may be constituted by MCC codes 3501-3790. The general merchant category of "airlines" may be constituted by MCC codes 3000-3299. And the general merchant categories of restaurants may be constituted by MCC code 5812. FIG. 8 illustrates an exemplary abbreviated listing or table 800 of MCC codes, general merchant category, and corresponding federal IRS reportability rules under sections 6041, 6041A. Such a table may be stored in memory on the server and/or TLR device 224 and updated periodically so as to maintain current or real-time mapping of MCC code and reporting requirements associated therewith according to local, state and federal authorities. A cardholder/payor may rely on the MCC or equivalent Industry Code assigned to a merchant/payee in determining whether a payment card transaction with that merchant/payee is subject to information reporting under section 6041 or section 6041A. Thus, if a merchant/payee is assigned an MCC and the table in FIG. 8 indicates that payments to merchants in that category are not reportable under section 6041 or section 6041A, a cardholder/payor is not required to report payment card transactions with the merchant/payee. The transaction data may be augmented with external data (e.g. non-payment card transaction data). The external data may reside within the same transactions data base or may be linked in a separate date base, by way of non-limiting example.

The payment card transactions records may be obtained via various transaction mechanisms, such as credit and debit card transactions between customers and merchants. The external data that may be included in the historical data may include historical tax filing data of multiple entities as well as historical normalized spend and income data via aggregation of individual income, spend data in like categories. In addition, the TLR computing device may include a module or component that performs and updates a time series on tax rates given that tax rates in fact change over time. The rise or fall of tax revenues may be determined because this is event driven.

An analytics engine operates on the transaction data by performing statistical analyses in order to construct logical relationships within and among the transactions records data in order to determine particular categories and purchase amounts. Various types of models and applications may be configured and utilized by the analytics engine in order to derive information from the transactions data. Further statistical processing of the transaction data includes independent variable analysis purchase sequencing, segmentation, clustering, ranking, and parameter modeling, to establish profiles, trends and other attributes and relationships that link merchants, customers, events and transaction amounts to various purchases or returns. For example, the analysis engine operates on the transactions records to cluster or group certain sets of objects (information contained in the data records) whereby objects in the same group (called a cluster) express a degree of similarity or affinity to each other over those in other groups (clusters).

Further statistical and variable analysis processing is utilized in order to ascribe attributes to purchasers of a given transaction. Variables such as time, purchase frequency, purchasing geography and location, aggregate customer spending, and the like may be used to develop profiles for particular transaction events, merchants, and customers, as well as more generalized aggregate profiles directed to classes or categories of products purchased, merchants, customers, and regions, as well as overall information falling within a particular goods or services category.

Data segmentation of the transaction data associated with the analytics engine includes dividing customer information (e.g. customer IDs) into groups that are similar in specific ways relevant to other variables or parameters such as geographic region, spending preferences, customer type (e.g. individual consumer or business), demographics, and so on. By way of example only, variables may be defined according to different merchant categories and may have different degrees of correlation or association based on the type or category of merchant. Similarly, different products and/or services of particular merchants may likewise have different degrees of correlation or association. Furthermore, variable analysis of purchasing frequency with respect to particular products and/or merchants may also be utilized as part of the analytical engine in order to determine particular consumers and spend behavior.

The profiles and attributes may be applied to one or more particular customers or merchants in order to provide particular insights for a select application. Such applications include by way of non-limiting example, providing enhanced product information to a particular industry.

Each or any combination of the modules and components shown in FIG. 5 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure.

FIG. 5. is a process flow 500 for a system and method for determining correlations between customer and merchant spend and income based on payment card transactions, in order to determine patterns and categories of spend and/or income associated with individuals categorized within a same range of income and one or more of tax bracket, geographic region, age, and/or other demographic parameters. Referring to block 510, payment card transaction data is received by, for example, a card network. From this received transaction data, a transaction database may be constructed (block 520). A transaction database may consist of cardholder transactions, including generalized data, such as date, time and amount, as well as customer information. Customer information may include customer account identification, customer geography, customer type (business/consumer) and other customer demographics. Merchant information may also be obtained including, but not limited to merchant name, merchant geographical data, line of business, etc.

External market and/or industry data (block 530) may be obtained from third party providers or independent research, by way of example only. This data may be used to create historical databases in block 540. Such historical data may include individual or corporate tax filing data and profiles, including prior income and expense data over a given interval (e.g. tax year), as well as correlation data and profiles relating to income and spend for entities in select demographics and tax brackets, investment data corresponding to a given entity, market data and industrial data. Market data may include normalized income and/or spend data utilizing significant numbers of individuals grouped in the same categories as a particular entity under examination. Normalized profiles according to MCC code or general merchant category may be generated and compared so that outlier analysis or other statistical analysis may be performed based on a particular tax entity or tax identifier falling within a particular profile. Graphical illustration of such distributions may illustrate heavy concentration of a population within a given taxable income range associated with one or more MCC codes or category spend values so as to identify outliers who fall outside a predetermined threshold or threshold index (e.g. two or more standard deviations). In this manner, the system may efficiently detect and determine whether such outliers warrant an audit review/inquiry.

In block 550 a filtering process may be performed, which may include temporal filtering and/or MCC filtering which may vary based on need or available data.

Referring to block 560, filtered data is subjected to several analytical operations. For example, market geographies or boundaries may be established. Establishing market boundaries may be achieved utilizing merchant geography groupings that may include city, state or country information. Likewise, standard statistical analysis may be employed, including, for example, clustering, segmentation, raking and the like for estimating market boundaries. Further still, external data may be used, including Nielsen Designated Market Area (DMA) data, specific market information on particular industries, and/or specific large acquisitions or exchanges, such as real estate, business receipts, investments, and Metropolitan Statistical Area (MSA) data.

This data analysis may be used to guide the generation of logic (block 570) for ascribing particular attributes of a given entity (e.g. cardholder or merchant) in comparison to aggregated historical data of other individuals in the same income category. This logic may include sampling techniques, wherein a sample analysis is made of individuals known to possess the same categorical parameters for the purposes of performing "dependent variable" analysis. Sampling may also be used to create profiles based on data that may include demographics or spending profiles.

In exemplary embodiments, payment card network transaction record data of an account associated with a taxable entity may be analyzed by the TLR to generate one or more spending profiles associated with the entity. In embodiments, each of the one or more spending profiles may be associated with one or more categories of merchants, such as one or more MCC's. For example, a spending profile may include a rate, or range of rates, of spending at a category of merchant. Such spending profile may include, for example, an annual, monthly or quarterly rate. A spending profile may include a rate and a category, such as restaurants. A spending profile may include an overall rate and multiple categories, such as restaurants, entertainment, and shopping. A spending profile may include multiple rates corresponding to different categories, and/or rates corresponding to multiple categories in the aggregate, and rates corresponding to sub-categories.

Similarly, payment card network data representing a large number of taxable entities having a range of taxable income, or otherwise selected, may be processed to generate spending profiles. In embodiments, average, median or mean spending profiles may be generated. Comparable spending profiles, having directly comparable categories and time periods for rates, for taxpaying entities, may be compared directly. Threshold values may be established for rates as percentages, dollar values, and the like, in some embodiments. The correlation index in some embodiments may represent a single deviation in rate, such as for a spending profile having a single rate for a single merchant category or single range of merchant categories, or may represent a factor, such as an average deviation in rate for a spending profile having multiple separate rates corresponding to multiple profiles. In other embodiments, a statistical distribution of spending profiles corresponding to a given taxable income or taxable income range may be stored. A spending profile for a taxpayer may be analyzed to determine where the spending profile falls on the statistical distribution, and thresholds may be stored for deviation from a mean on the statistical distribution, for example. In such an embodiment, a correlation index may represent a value such as a deviation from a mean.

FIG. 6 is a block process flow diagram illustrating features of the correlation and analysis functions for pattern identification of FIG. 5 and comparison with historical data to detect whether the tax information associated with a given entity falls within an expected range based on the historical information. For example, for each given tax entity, the TLR computing device according to an embodiment of the present invention may implement discriminant analysis to analyze relationships between non-metric dependent variables and metric or dichotomous independent variables for generating one or more models for classification purposes. Objects and events are randomly sampled and independent samples processed for normal distribution, with linear relationships among predictor pairs within groups. Based on the transaction records processing, large sample sizes of data relative to the number of variables (greater than 20:1) are utilized. In an embodiment, the TLR computing device (block 610) extracts information from vast data sets to determine patterns and relationships according to data analysis tools and analytics in order to generate one or more predictive models for predicting or determining whether a given tax entity should be audited. Pattern matching and profile selection for what different taxpayers report, determination of averages of what different income levels report in specific categories of income, deductions, credits and the like are utilized to generate profiles for subsequent comparison with specific tax entity (taxpayer) information based on payment card transactions records. In one embodiment, the TLR device may implement decision trees that use one or more input variables, including MCC code filtering, for target variable prediction. In one embodiment, linear and/or logistic regression processing may be implemented, including use of one or more input variables (e.g. MCC code, income, expenses, demographics) to fit a target variable by means of linear combinations. In an embodiment, the TLR device may implement a neural network for predicting one or more target variables based on the inputs. Weighting functions useful for applying weights to input variables may be implemented to different tax item variables based on importance in predicting whether or not a given tax return should be audited. In an exemplary embodiment statistical logic and analysis (block 620) is applied to correlation group data to determine the degree of correlation between entity spend, income, based on one or more of historical profile group data and historical payment card transaction records data and actual historical tax filing data, to generate income and spend profiles based on merchant category codes and/or classifications. Threshold processing is applied to the profile data of the tax entity based on the transaction records data, according to one or more MCC codes or general merchant categories, relative to nominal or average profile values for like entities based on historic spend according to the one or more MCC codes or general merchant categories. Based on the comparison, a large uncorrelation or outlier index result may be indicative that the tax entity reported income is not in line with the income inferred by the transactions records data. When this condition (correlation index deviates from or exceeds the predetermined threshold indicative of a high degree of uncorrelation) is detected (block 630) the TLR generates a signal indicative of a request for secondary review of a tax filing of entity. Otherwise, the TLR generates a signal indicative of a validated tax filing of an entity when the correlation index falls within a nominal threshold range.

FIG. 7 illustrates an exemplary process flow for validating tax entity and including at least one of income and expense data corresponding to the taxable entity in a given jurisdiction according to one embodiment of the disclosure. By way of non-limiting example, the TLR process may be configured to examine an individual cardholder with attributes of a single, male, age 30 who has filed taxes with the IRS (identified income of $47,000, tax bracket B and having a tax ID number ITIN 666666666) by obtaining all payment card transaction records (710) relating to the card holder over a given time period (e.g. 2 years). The payment card transaction records for this cardholder are then analyzed (720) by the TLR processor and individual spend categories relating to an MCC code or general merchant category or type (e.g. high-priced restaurants; high-priced ticket events) are generated and stored in memory in relation to this cardholder. Historical information associated with other cardholder members having profile attributes within the same categories as the cardholder is also processed (e.g. males, single, age 28-32, identified income $45,000-$50,000; tax bracket B). The historical data associated with other cardholder members is processed to determine an average or normal distribution spend value that is compared with the spend value determined based on the cardholder payment card transactions data (block 730). The spend values are correlated and compared (block 740) to obtain a correlation score representative of the relative degree of correlation between the spend values based on the merchant categories. If the correlation score exceeds a threshold (block 750) indicative of a large difference in spend (overage) by the cardholder relative to the historical normal distribution data (e.g. 20 times or two standard deviations) for similar taxable entities with similar income, the processor triggers a secondary review of the cardholder's tax filing (block 760). Otherwise, the processor determines that the cardholder spend data is not inconsistent with the tax information provided to the tax authority, indicative of a validated or verified tax entity. In one configuration, the process is configured with a feedback loop to obtain and process feedback information to adjust one or more threshold values and/or spend parameters based on the results of the audit for greater correlation accuracy.

An additional implementation includes a tip calculation process wherein the system uses authorization (pre-tip) and transaction record clearing data to estimate average tip income, extrapolate to total sales, and estimate total expected tips from businesses for correlation with reported tips for each employee. For example, the TLR may receive and analyze reported tips from an initial credit authorization, filtered according to MCC category code, wherein the initial credit card authorization only reflects food, and subsequently capture final clearing data associated with the transaction that reflects the actual tip provided. The system may analyze a statistically significant sample or cross-section of restaurant workers (waiter, waitress, bartender, takeout delivery personnel) to identify profile trends or patterns with regard to income based on the transactions records, compare with the business entity transaction records and tax data, to determine deviations in the transaction data (e.g. for a geographic segment) that can serve as the basis of a tip audit. Similar TLR processing may be implemented for other businesses, such as taxis, delivery services, valets, and the like.

In embodiments, TLR processing may provide a signal to a payment network or merchant bank causing a flag to be associated with an account number associated with a taxable entity indicated as having a correlation index deviating from a predetermined threshold. In addition to a flag, further details as to spending profiles of an entity and tax-derived data may be stored. As tax-related information is particularly sensitive, the existence of such a flag and/or other data generates a business and technical problem of maintaining such information accessible while avoiding risk of improper access to such information. In some embodiments, the flag may be stored in an encrypted form, with an encryption value higher than customary encryption values in the network or merchant bank database. For example, the encryption may be 256 bit encryption rather than 128 bit encryption. In some embodiments, a separate physical storage device, storing account identifier and corresponding tax-related data, which may include flag data and further data relating to spending profiles, is established on the payment network. In these embodiments, the flag and/or other tax-related data is stored nowhere else on the payment network, and the separate physical storage device has encryption protection, physical and/or software-implemented firewalls, or other security measures distinct from those elsewhere on the network. In some embodiments, the flag and/or other tax-related data may be stored at physical and/or logical locations distinct from other data related to the payment card processing network, which physical and/or logical locations are subject to a greater intensity of access security screening and/or a greater frequency and/or intensity of screening and analysis to detect attempted access. In embodiments, a physical storage location may be disconnected from a network except when a message is received at a switch that an update, such as a result of TLR device analysis, is to be made, or when access, such as access from an authenticated user at a tax authority, is requested.

In some embodiments, the TLR device may obtain access to tax-related data for one or more tax-paying entities from a distinct storage location having enhanced encryption or other security measures such as those as described above, store the data in one or more locations, use the tax-related data for performance of TLR analysis, transmit a result to the same or a different distinct storage location having enhanced encryption and/or other security measures such as those described above, and then irretrievably delete the stored tax-related data, such as by randomly rewriting all bits in the data locations where the tax-related data was stored. The TLR device may provide a report or certification of such irretrievable deletion to one or more security logs.

The flow charts described herein do not imply a fixed order to the steps, and embodiments of the present invention may be practiced in any order that is practicable. In embodiments, one or more steps of the methods may be omitted, and one or more additional steps interpolated between described steps. Note that any of the methods described herein may be performed by hardware, software, or any combination of these approaches. For example, a non-transitory computer-readable storage medium may store thereon instructions that when executed by a processor result in performance according to any of the embodiments described herein. In embodiments, each of the steps of the methods may be performed by a single computer processor or CPU, or performance of the steps may be distributed among two or more computer processors or CPU's of two or more computer systems. In embodiments, one or more steps of a method may be performed manually, and/or manual verification, modification or review of a result of one or more processor-performed steps may be required in processing of a method.

The embodiments described herein are solely for the purpose of illustration. Those in the art will recognize that other embodiments may be practiced with modifications and alterations limited only by the claims.

The invention claimed is:

1. A method for validating tax data including at least one of income and expense data corresponding to a taxable entity in a given tax jurisdiction, comprising:

receiving at a first computing device, payment card transaction records data including customer identifiers, merchant identifiers, merchant category codes, and transaction purchase amounts corresponding to product purchase transactions of the taxable entity over a given time period;

analyzing the payment card transaction records data of the taxable entity using a mapping table accessible by the first computing device which maps merchant category codes with corresponding tax reporting requirement indicators, and filtering said transactions records data according to one or more of said merchant category codes, to generate one or more spending profiles for said entity according to one or more categories of merchants based on said mapping table;

correlating said one or more spending profiles of said entity with one or more other aggregated spending profiles representative of historical spending by additional entities whose reported income is within a given range of said entity reported income and based on said one or more merchant category codes, to generate a correlation score;

the computing device generating a correlation index by comparing said correlation score with a threshold correlation score value, the correlation index indicative of the degree of correlation between the entity profile spending of the taxable entity, and the aggregated profile spending of the additional entities whose reported income is within the given range of said entity reported income; and automatically generating by said first computing device a request for secondary review of a tax filing of said entity in response to detecting when said correlation index deviates from a predetermined threshold indicative a high degree of uncorrelation, and transmitting to one of the payment network and bank associated with the taxpayer entity a message to cause a flag to be associated with an account number of said taxable entity that identifies said taxable entity for secondary review, wherein said flag is stored in a data base at a location corresponding to one of the payment network and bank associated with the taxpayer entity in an encrypted form with an encryption bit value greater than a nominal encryption bit value associated with the network or bank database; and, otherwise generating a message indicative of a validated tax filing of said entity.

2. The method of claim 1, wherein the correlating said one or more spending profiles of said entity with one or more other aggregated spending profiles representative of historical spending by additional entities whose reported income is within a given range of said entity reported income includes determining entity income and spend amounts.

3. The method of claim 1, wherein said correlation deviation indicative of a highly uncorrelated detection comprises at least one standard deviation.

4. The method of claim 1, wherein analyzing the transaction record data further includes determining the customer identifier, the transaction purchase amount, and a class of the merchant corresponding to said transaction record, and comparing with historical data of previous payment card transactions of at least one of the customer and merchant, to generate said one or more spending profiles.

5. The method of claim 4, wherein said one or more spending profiles are dependent on demographic information corresponding to said entity.

6. A validation computing device for validating tax data including at least one of income and expense data corresponding to a taxable entity in a given tax jurisdiction, the validation computing device comprising a memory device and a processor coupled to said memory device, said validation computing device configured to:

receive payment card transaction records data including customer identifiers, merchant identifiers, merchant category codes, and transaction purchase amounts corresponding to product purchase transactions of the taxable entity over a given time period;

process the payment card transaction records data of the taxable entity using a mapping table accessible by the computer processor which maps merchant category codes with corresponding tax reporting requirement indicators, and filter said transactions records data according to one or more of said merchant category codes, to thereby generate one or more spending profiles for said entity according to one or more categories of merchants based on the payment card transaction records data and said mapping table;

receive historical data including reported tax income and expense data of said entity and of other entities sharing the same one or more profiles, and their transaction records;

correlate the historical data and the one or more spending profiles for said entity to generate a correlation indicator representative of the degree of correlation between the entity spending profiles and the historical data and based on said one or more merchant category codes;

in response to determining the correlation indicator exceeds a predetermined threshold indicative of a high degree of uncorrelation of one or more of said spending profiles for said entity in relation to the received historical data including the shared spending profiles of other entities and based on one or more merchant category codes, automatically generate a request for secondary review of the tax filing of said entity, and transmit to one of the payment network and bank associated with the taxpayer entity a message to cause a flag to be associated with an account number of said taxable entity that identifies said taxable entity for secondary review, wherein said flag is stored in a data base at a location corresponding to one of the payment network and bank associated with the taxpayer entity in an encrypted form with an encryption bit value greater than a nominal encryption bit value associated with the payment network or bank.

7. The validation computing device of claim 6, further configured to update weighting functions to apply different weights to one or more input variables for target variable prediction as part of said correlating step in determining whether or not a given tax return should be audited, based on results of said secondary review.

8. A non-transitory computer-readable storage medium having computer-executable instructions embodied thereon, wherein when executed by a tax validation computing device having at least one processor, the computer-executable instructions cause the tax validation computing device to:

receive payment card transaction records data including customer identifiers, merchant identifiers, merchant category codes, and transaction purchase amounts corresponding to product purchase transactions of the taxable entity over a given time period;

process the payment card transaction records data of the taxable entity using a mapping table accessible by the computer processor which maps merchant category codes with corresponding tax reporting requirement indicators, and filter said transactions records data according to one or more of said merchant category codes, to thereby generate one or more spending profiles for said entity according to one or more categories of merchants based on the payment card transaction records data and said mapping table;

receive historical data including reported tax income and expense data of said entity and of other entities sharing the same one or more profiles, and their transaction records;

determine, using the historical data and the one or more spending profiles for said entity, a correlation indicator representative of the degree of correlation between the entity spending profiles and the historical data and based on said one or more merchant category codes;

automatically generate a request to initiate a secondary review of the tax filing of said entity when said correlation indicator is greater than a threshold value, indicative of a high degree of uncorrelation of one or more of said spending profiles for said entity relative to the historical data the shared spending profiles of other entities and based on one or more merchant category codes, and transmit to one of the payment network and bank associated with the taxpayer entity a message to cause a flag to be associated with an account number of said taxable entity that identifies said taxable entity for secondary review, wherein said flag is stored in a data base at a location corresponding to one of the payment network and bank associated with the taxpayer entity in an encrypted form with an encryption bit value greater than a nominal encryption bit value associated with the payment network or bank.

* * * * *